United States Patent
Wildey et al.

(10) Patent No.: US 9,302,536 B2
(45) Date of Patent: Apr. 5, 2016

(54) WHEEL COVER

(71) Applicant: Consolidated Metco, Inc., Vancouver, WA (US)

(72) Inventors: Graham Wildey, Vancouver, WA (US); Michael Miga, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 546 days.

(21) Appl. No.: 13/901,823

(22) Filed: May 24, 2013

(65) Prior Publication Data

US 2014/0346844 A1    Nov. 27, 2014

(51) Int. Cl.
| | |
|---|---|
| *B60B 7/04* | (2006.01) |
| *B60B 7/10* | (2006.01) |
| *B60B 7/00* | (2006.01) |
| *B60B 7/12* | (2006.01) |
| *B60B 7/16* | (2006.01) |

(52) U.S. Cl.
CPC . *B60B 7/10* (2013.01); *B60B 7/008* (2013.01); *B60B 7/12* (2013.01); *B60B 7/16* (2013.01); *B60B 2900/113* (2013.01)

(58) Field of Classification Search
CPC ............ B60B 7/10; B60B 7/008; B60B 7/12; B60B 7/16; B60B 2900/113
USPC ............. 301/37.101, 37.102, 37.103, 37.104, 301/37.28
See application file for complete search history.

(56) References Cited

U.S. PATENT DOCUMENTS

| | | | | |
|---|---|---|---|---|
| 2,109,684 | A * | 3/1938 | Short ...................... | B60R 25/00 |
| | | | | 206/304 |
| 2,567,142 | A * | 9/1951 | Barker .................... | B60B 7/105 |
| | | | | 301/37.34 |
| 3,371,832 | A * | 3/1968 | Sekino ................... | B62D 43/02 |
| | | | | 244/42.21 |
| 4,995,673 | A * | 2/1991 | DuBost .................... | B60B 7/08 |
| | | | | 301/37.36 |
| 2012/0314980 | A1* | 12/2012 | Chen .................. | H04M 1/0237 |
| | | | | 384/26 |

* cited by examiner

*Primary Examiner* — S. Joseph Morano
*Assistant Examiner* — Jean Charleston
(74) *Attorney, Agent, or Firm* — Edward J. Brosius

(57) ABSTRACT

A commercial vehicle wheel cover including a frame having a locking door, at least two hinge points, at least two spring attachments, and at least two retaining features. The frame has a front side and a back side, with the at least two hinge points arranged integrally and circumferentially on the back side of the frame. The at least two spring attachments are rotatably connected to the at least two hinge points. The at least two retaining features are located adjacent to said at least two hinge points in the radial direction, and the at least two spring attachments are secured in the at least two retaining features. One of the at least two hinge points is located on the locking door. The locking door is used to install the final spring attachment on the drop center or hub of a wheel.

16 Claims, 3 Drawing Sheets

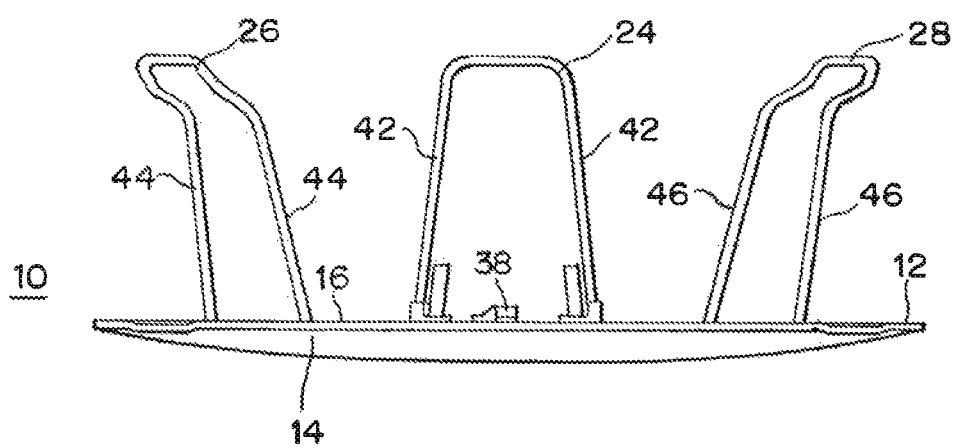
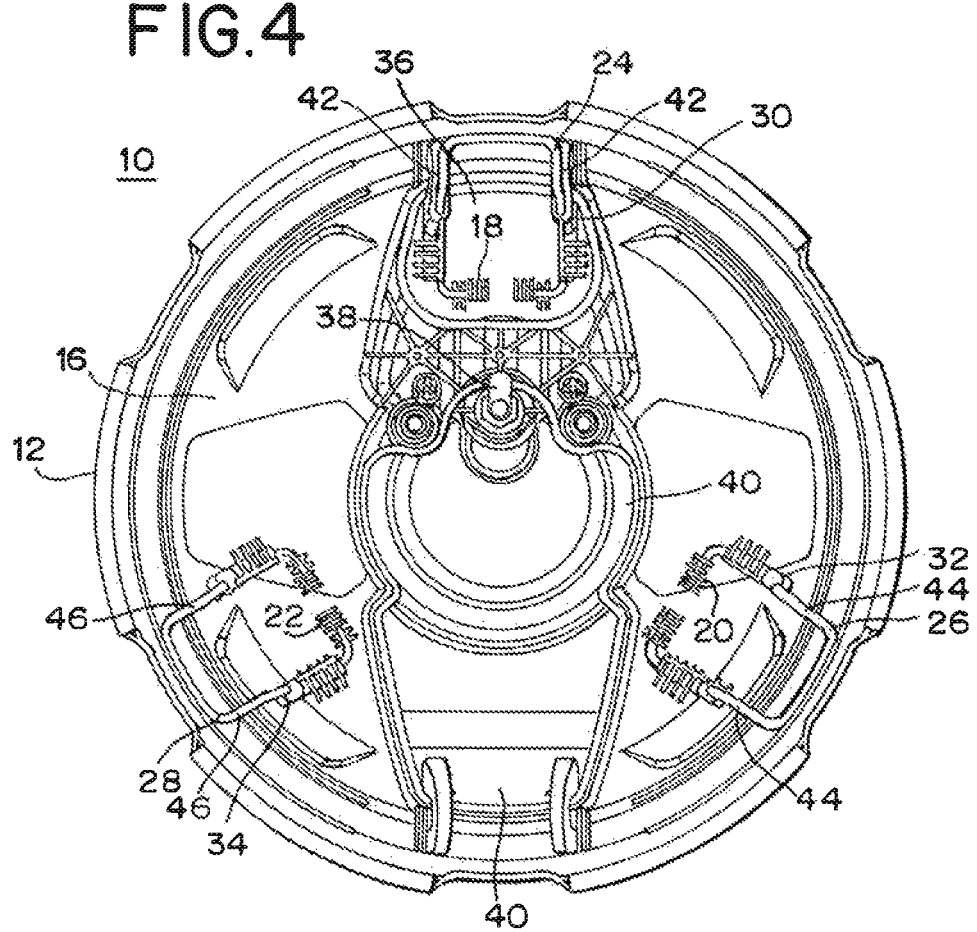

WHEEL COVER

BACKGROUND OF THE INVENTION

The invention relates generally to a commercial vehicle Wheel cover, and more particularly to a wheel cover with a collapsible attachment system.

This invention is applicable to commercial vehicles, namely trucks. A wheel cover is used create a more aerodynamic shape on commercial vehicles, by filling the void or indentation created by the rims of the wheels. The wheel covers are installed manually by a mechanic, a truck driver, or another person, and generally take a significant amount of time to complete installation on all the tires.

The current wheel covers used in the commercial vehicle industry are difficult and time consuming to install, and do not provide an easy method for pre-trip inspection. After the wheel covers are installed, an operator will likely have to completely or partially uninstall the wheel covers to comply with the pre-trip inspection laws requiring the operator to inspect the hubs and wheels prior to every trip.

The present invention provides a wheel cover that allows for the simplification of the installation process, and can be shipped in a small container because of the articulating design. The present invention also provides a wheel cover with an inspection door and window, allowing the operator to inspect the wheel and hub, or complete light maintenance.

SUMMARY OF THE INVENTION

In accordance with the present invention, a commercial vehicle wheel cover is provided for use.

One embodiment of the present commercial vehicle wheel cover includes a frame having a locking door, at least two hinge points, at least two spring attachments, and at least two retaining features. The frame has a front side and a back side, with the at least two hinge points arranged integrally and circumferentially on the back side of the frame. The at least two spring attachments are rotatably connected to the at least two hinge points. The at least two retaining features are located adjacent to the at least two hinge points in the radial direction on the frame, and the at least two spring attachments are secured in the at least two retaining features. One of the at least two hinge points is located on the locking door.

Another embodiment of the present commercial vehicle wheel cover includes a frame having a locking door, a plurality of hinge points, a plurality of spring attachments, and a plurality of retaining features. The frame has a front side and a back side, with the plurality of hinge points arranged integrally and circumferentially on the back side of the frame. The plurality of spring attachments are rotatably connected to the plurality of hinge points. The plurality of retaining features are located adjacent to the plurality of hinge points in the radial direction on the frame, and the plurality of spring attachments are secured in the plurality of retaining features. One of the plurality of hinge points is located on the locking door.

Another embodiment of the present invention includes a frame having a front side and a back side, a plurality of hinge points arranged integrally and circumferentially on the back side of the frame, a plurality of spring attachments that are rotatably secured in the plurality of hinge points, and a plurality of retaining features located adjacent to the hinge points in the radial direction on the frame. The plurality of retaining features secure the plurality of spring attachments and restrict the rotation of the plurality of spring attachments. One of the plurality of hinge points is located on a locking door of the frame.

It is an object of the present invention to provide a commercial vehicle wheel cover that improves the overall aerodynamic shape of a vehicle.

It is another object of the present invention to provide a commercial vehicle wheel cover that is simple to install and can be installed by a user in minimal time.

It is another object of the present invention to provide a commercial vehicle wheel cover that has an inspection door or window that allows a user access to the drop center or hub, and tire, to complete pre-trip inspection as required by law.

It is another object of the present invention to provide a commercial vehicle wheel cover that is collapsible and can be shipped in a small container.

It is another object of the present invention to provide a commercial vehicle wheel cover that includes spring attachments that attach to the drop center or rim of a wheel.

It is a further object of the present invention to provide a commercial vehicle wheel cover with an articulating attachment design that allows the spring attachments to collapse for shipping purposes.

It is a further object of the present invention to provide a commercial vehicle wheel cover with a locking door that ensures simple and proper installation of all spring attachments.

It is a still a further object of the present invention to provide a commercial vehicle wheel cover that can be positively locked to ensure installation and help prevent theft of the wheel cover.

It is still a further object of the present invention to provide a commercial vehicle wheel cover with an inspection door or window that provides visual and physical access for inspection by a user.

It is a yet a further object of the present invention to provide a commercial vehicle wheel cover that has a plurality of articulating spring attachments that can be rotated into an engaged position and locked into a plurality of retaining features.

DESCRIPTION OF THE DRAWINGS

FIG. 3 is a side elevational view of the commercial vehicle wheel cover of the present invention.

FIG. 4 is a bottom plan view of the commercial vehicle wheel cover of the present invention.

DETAILED DESCRIPTION

Figure 1:
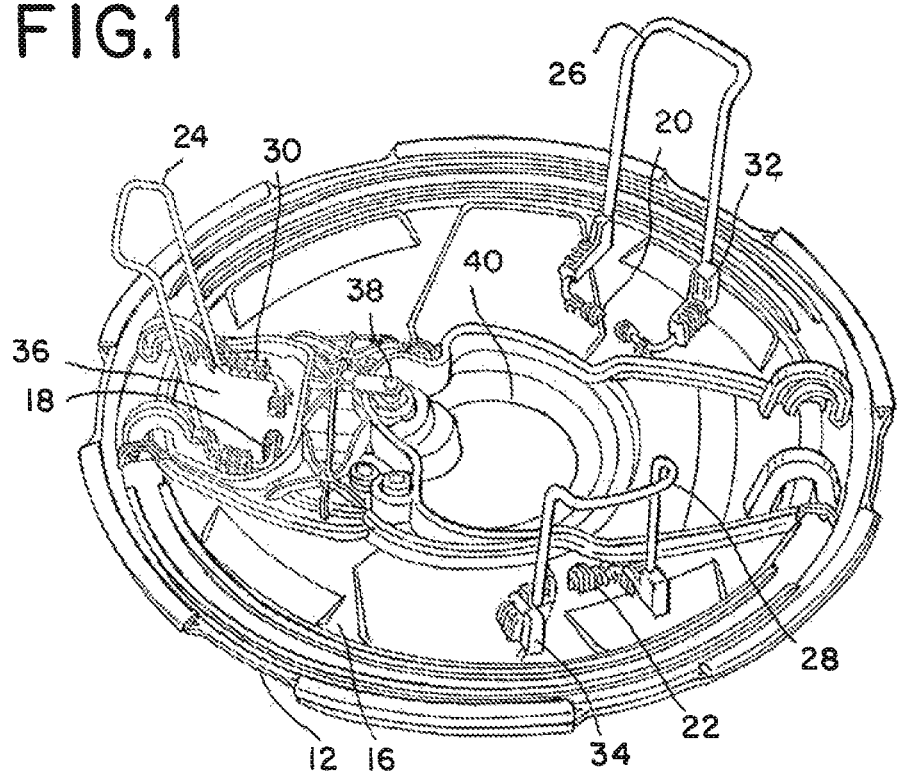
FIG. 1 is an isometric view of the commercial vehicle wheel cover of the present invention in the engaged position.
Figure 2:
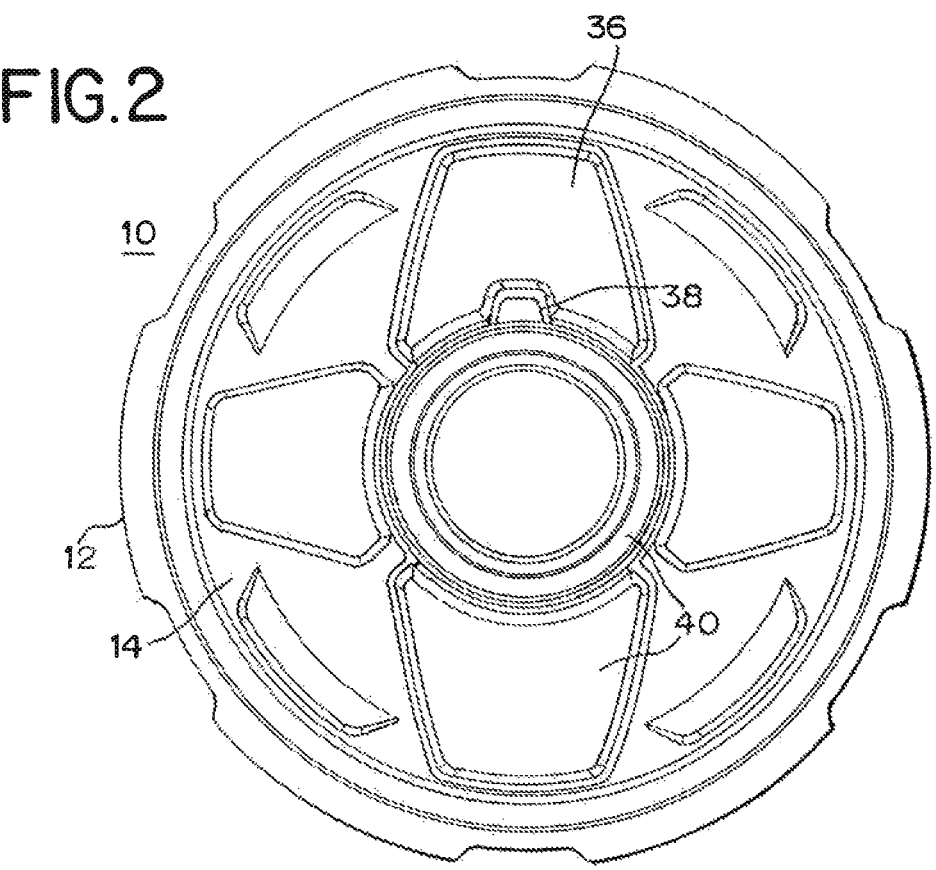
FIG. 2 is a top plan view of the commercial vehicle wheel cover of the present invention.

Referring now to FIGS. 1-4, a commercial vehicle wheel cover in the engaged position is generally designated 10, and comprises a frame 12, hinge points 18, 20, 22, spring attachments 24, 26, 28, retaining features 30, 32, 34, a locking door 36, and an inspection door 40. The wheel cover 10 is designed to fit over and secure to the drop center or hub (not shown) of a commercial vehicle wheel, improving the overall aerodynamic shape of the vehicle.

The frame 12 is generally round and dome-shaped, and has a front side 14 and a back side 16. The frame 12 encloses a locking door 36 and an inspection door 40. The back side 16 of the frame 12 has hinge points 18, 20, 22 integrally and circumferentially spaced on the frame 12. Spring attachments 24, 26, 28 are rotatably mounted in the hinge points 18, 20, 22. Spring attachments 24, 26, 28 are articulating members and can rotate from the folded position (shown in FIG. 6), into the engaged position (shown in FIG. 1) that is required for installation onto the drop center (not shown) of the wheel.

The frame 12, locking door 36, and inspection door 40 can be made from a polymeric material by a molding process, or it can be made from a metallic material by a stamping process. The spring attachments 24, 26, 28 are generally made out of a metallic material, preferably steel.

Spring attachments 24, 26, 28 rotate about hinge points 18, 20, 22 to the engaged position, and are locked into the retaining features 30, 32, 34 by squeezing the legs 42, 44, 46 towards each other and into the retaining features 30, 32, 34. The legs 42, 44, 46 of the spring attachments 24, 26, 28 snap or lock into the retaining features 30, 32, 34, and the retaining features 30, 32, 34 prevent the spring attachments 24, 26, 28 from further rotation while in the engaged position.

The front side 14 of frame 12 encases a locking door 36 with a locking mechanism 38, and an inspection door 40. The locking mechanism 38 can be unlocked and locked, and the locking door 36 opened and closed, by a user from the front side 14 of the frame 12. It is contemplated that the locking mechanism 38 be a key and lock, a combination, or any other type of lock. The inspection door 40 can also be opened by a user from the front side 14 of the frame 12. Both the locking door 36 and the inspection door 40 allow a user to complete pre-trip inspection and light maintenance on the wheel, hub, or drop center on a commercial vehicle as required by law, without removing the wheel cover 10 itself. The locking door 36 also allows a user to install the final spring attachment onto the drop center or hub of the wheel by engaging the final spring attachment.

Figure 5:
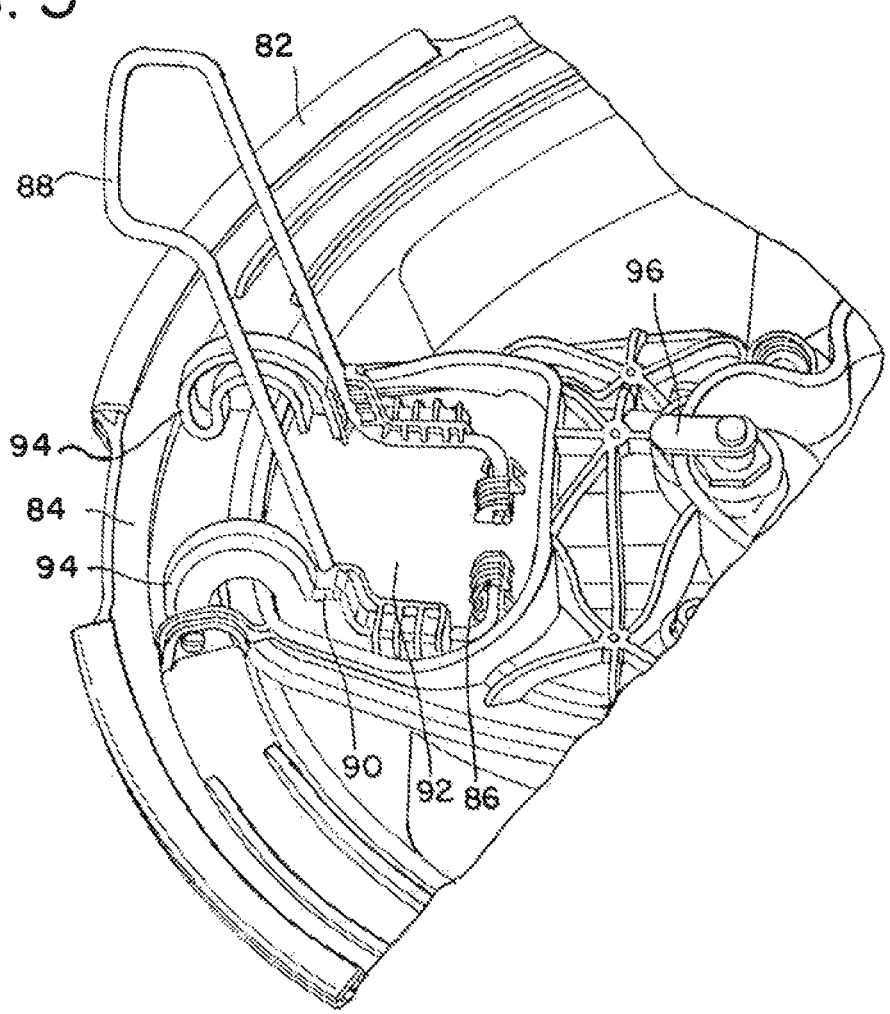
FIG. 5 is a magnified view of the locking door of the commercial vehicle wheel cover of the present invention.

Referring now to FIG. 5, a magnified view of a locking door of a commercial vehicle wheel cover is generally designated 80, and comprises a frame 82, a hinge point 86, a spring attachment 88, a retaining feature 90, a locking door 92, and a locking door hinge 94. The locking door 92 is enclosed by the frame 82 and is connected to the frame 82 by hinges 94. The hinges 94 allow the locking door 92 to rotate outward in the axial direction with respect to the frame 82. The hinge point 86 securing the spring attachment 88 is located on the locking door 92.

The frame 82 is installed on a commercial vehicle wheel by first opening the locking door 92 and attaching the spring attachments that are not connected to the locking door 92 (shown in FIGS. 1-5) to the drop center or hub of the wheel. A user then closes the locking door 92, exerting pressure on the spring attachment 88 that is located on the back of the locking door 92 and in the engaged position, positively engaging the spring attachment 88 onto the drop center or hub of the wheel, and locking it in place. The locking door 92 can then be locked using the locking mechanism 96 to further ensure proper installation and prevent theft of the wheel cover.

The spring attachment 88 on the locking door 92 allows a user to quickly and easily install the wheel cover when compared to previous wheel cover designs. The articulating locking door 92 provides the user with access to install all of the spring attachments except the spring attachment 88 connected to the locking door 92, and also provides the user with a simple method to install the final spring attachment 88 by closing the locking door, exerting pressure on the spring attachment 88 and locking it onto the rim.

Figure 6:
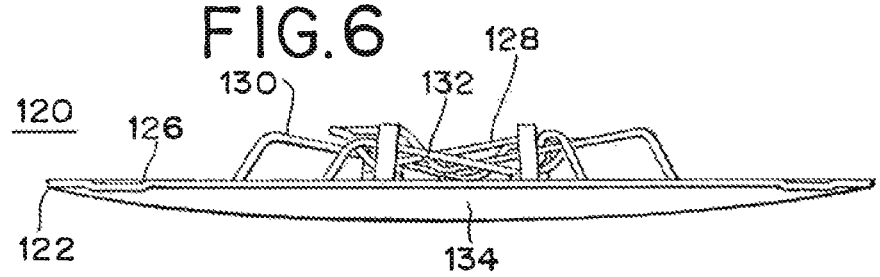
FIG. 6 is a side elevational view showing the commercial vehicle wheel cover in the folded position.

Referring now to FIG. 6, a commercial vehicle wheel cover in the folded position is generally designated 120. The spring attachments 128, 130, 132 collapse downward towards the back side 126 of the frame 122 to allow the wheel cover 120 to fit into a small container for shipping purposes. For shipping purposes, the locking door 134 remains closed and is flush with the frame 122. After shipping, the articulating spring attachments 128, 130, 132 are rotated to the engaged position (shown in FIGS. 1-5), and the wheel cover 120 can be installed.

While particular embodiments of the present invention have been illustrated and described herein, it will be appreciated by those skilled in the art that changes and modifications may be made thereto without departing from the invention in its broader aspects.

What is claimed is:

1. A commercial vehicle wheel cover comprising:
   a frame having a locking door;
   at least two hinge points;
   at least two spring attachments;
   at least two retaining features;
   wherein said frame has a front side and a back side, said at least two hinge points arranged integrally and circumferentially on said back side of said frame, said at least two spring attachments rotatably connected to said at least two hinge points;
   wherein said at least two retaining features are located adjacent to said at least two hinge points in the radial direction on said frame, said at least two spring attachments secured in said at least two retaining features;
   wherein one of said at least two hinge points is located on said locking door.

2. The commercial vehicle wheel cover of claim 1, wherein said spring attachment attached to said hinge point located on said locking door is installed by closing said locking door and exerting pressure on said spring attachment.

3. The commercial vehicle wheel cover of claim 1, further comprising an inspection door on said frame, said inspection door allowing a user to perform pre-trip inspection of a hub and a wheel.

4. The commercial vehicle wheel cover of claim 1, wherein said at least two spring attachments secure to a drop center on a wheel.

5. The commercial vehicle wheel cover of claim 1, wherein said at least two spring attachments comprises three spring attachments.

6. The commercial vehicle wheel cover of claim 1, wherein said locking door requires a key to open said locking door.

7. A commercial vehicle wheel cover comprising:
   a frame having a locking door;
   a plurality of hinge points;
   a plurality of spring attachments;
   a plurality of retaining features;
   wherein said frame has a front side and a back side, said plurality of hinge points arranged integrally and circumferentially on said back side of said frame, said plurality of spring attachments rotatably connected to said plurality of hinge points;
   wherein said plurality of retaining features are located adjacent to said plurality of hinge points in the radial direction on said frame, said plurality of spring attachments secured in said plurality of retaining features;
   wherein one of said plurality of hinge points is located on said locking door.

8. The commercial vehicle wheel cover of claim 7, wherein said spring attachment attached to said hinge point located on said locking door is installed by closing said locking door and exerting pressure on said spring attachment.

9. The commercial vehicle wheel cover of claim 7, further comprising an inspection door on said frame, said inspection door allowing a user to perform pre-trip inspection of a hub and a wheel.

10. The commercial vehicle wheel cover of claim 7, wherein said plurality of spring attachments secure to a drop center on a wheel.

11. The commercial vehicle wheel cover of claim 7, wherein said plurality of spring attachments comprises three spring attachments.

12. A commercial vehicle wheel cover comprising:
 a frame having a front side and a back side;
 a plurality of hinge points arranged integrally and circumferentially on said back side of said frame;
 a plurality of spring attachments rotatably secured in said plurality of hinge points;
 a plurality of retaining features located adjacent to said hinge points in the radial direction on said frame;
 wherein said plurality of retaining features secure said plurality of spring attachments, restricting the rotation of said plurality of spring attachments;
 wherein one of said plurality of hinge points is located on a locking door of said frame.

13. The commercial vehicle wheel cover of claim 12, wherein said spring attachment attached to said hinge point located on said locking door is installed by closing said locking door and exerting pressure on said spring attachment.

14. The commercial vehicle wheel cover of claim 12, further comprising an inspection door on said frame, said inspection door allowing a user to perform pre-trip inspection of a hub and a wheel.

15. The commercial vehicle Wheel cover of claim 12, wherein said plurality of spring attachments secure to a drop center on a wheel.

16. The commercial vehicle wheel cover of claim 12, wherein said plurality of spring attachments comprises three spring attachments.

* * * * *